United States Patent
Hurlburt et al.

[15] 3,662,595
[45] May 16, 1972

[54] OSCILLATOR TYPE FORCE MEASURING SYSTEM INSENSITIVE TO INPUT VOLTAGE VARIATIONS

[72] Inventors: Charles E. Hurlburt, River Edge; Michael J. Lanni, Ridgewood; Alphons Fraenkel, Fairlawn, all of N.J.

[73] Assignee: The Bendix Corporation

[22] Filed: Mar. 19, 1970

[21] Appl. No.: 20,957

[52] U.S. Cl. ..........................................73/141 R, 73/517 B
[51] Int. Cl. ......................................G01l 1/14, G01p 15/08
[58] Field of Search ....................73/516, 517, 141; 318/651, 318/676, 678

[56] References Cited

UNITED STATES PATENTS

| | | | |
|---|---|---|---|
| 2,697,594 | 12/1954 | Stanton | 73/517 B |
| 3,057,195 | 10/1962 | Bently et al. | 73/517 B X |
| 3,074,279 | 1/1963 | Morris | 73/517 B |
| 3,213,694 | 10/1965 | Clark et al. | 73/517 B |

*Primary Examiner*—James J. Gill
*Attorney*—Plante, Hartz, Smith and Thompson

[57] ABSTRACT

A force measuring system includes an oscillator energized by an input voltage and having a tank circuit and means for changing the impedance of the tank circuit in accordance with the movement of an element in response to an applied force. The oscillator output voltage changes with changes in impedance and is compared to the input voltage to cancel out input voltage variations. The difference between the compared voltages is used to apply a restoring force to the movable element and the restoring force is a measurement of the applied force.

7 Claims, 2 Drawing Figures

INVENTORS:
CHARLES E. HURLBURT
MICHAEL J. LANNI
BY ALPHONS FRAENKEL

ATTORNEY

OSCILLATOR TYPE FORCE MEASURING SYSTEM INSENSITIVE TO INPUT VOLTAGE VARIATIONS

BACKGROUND OF THE INVENTION

1. Field of the Invention

This invention relates to force measuring systems and, particularly, to a servo type force measuring system having an oscillator circuit energized by an input voltage and affected by a movable force sensitive element for providing an output voltage varying with an applied force. More particularly, this invention relates to a force measuring system of the type described including means for rendering the system insensitive to input voltage variations.

2. Description of the Prior Art

Servo type force measuring systems using oscillator circuits are well known in the art. Oscillator impedance varies as a function of movement of a seismic mass in response to an applied force to provide a corresponding variation in oscillator output. The oscillator output is used to apply a restoring force to the seismic mass and the restoring force is a measurement of the applied force. A device of this type is described in U.S. Pat. 3,057,195 issued to Bently et al. on Oct. 9, 1962. Prior to this invention the oscillator output has included input voltage variations which detract from the measurement. The invention minimizes this problem by comparing the oscillator output to the input voltage for cancelling out the variations and providing the measurement as a function of the difference between the compared voltages.

SUMMARY OF THE INVENTION

This invention contemplates a servo type force measuring system including an oscillator energized by an input voltage and having a tank circuit with a capacitance which changes with displacement of a seismic mass functioning as a plate of a capacitor in the tank circuit. The oscillator output changes with the capacitance and is applied to an operational amplifier for comparison with the input voltage to cancel out input voltage variations. The output of the amplifier energizes a servo coil which restores the seismic mass to its original position for rendering the system in a force balance state. The voltage drop across a known resistor caused by the current through the coil is a precise measure of the input force.

One object of this invention is to provide a force measuring system including means for rendering the system insensitive to input voltage variations to measure the force more precisely than has heretofore been possible.

Another object of this invention is to provide a force measuring system including an oscillator and a tank circuit for the oscillator having an impedance which varies with an applied force for varying the oscillator output.

Another object of this invention is to vary tank circuit impedance by providing a seismic mass which functions as a capacitor plate. The mass is displaced in response to the applied force to vary tank circuit capacitance.

Another object of this invention is to compare the oscillator output voltage to the input voltage for measuring the force as a function of the difference between the compared voltages to render the system insensitive to input voltage variations.

Another object of this invention is to energize a servo coil as a function of the difference between the compared voltages and to connect said servo coil for restoring the seismic mass to its original position to render the system in a force balance state, with the voltage drop across an impedance caused by the current through the servo coil being a measurement of the input force.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
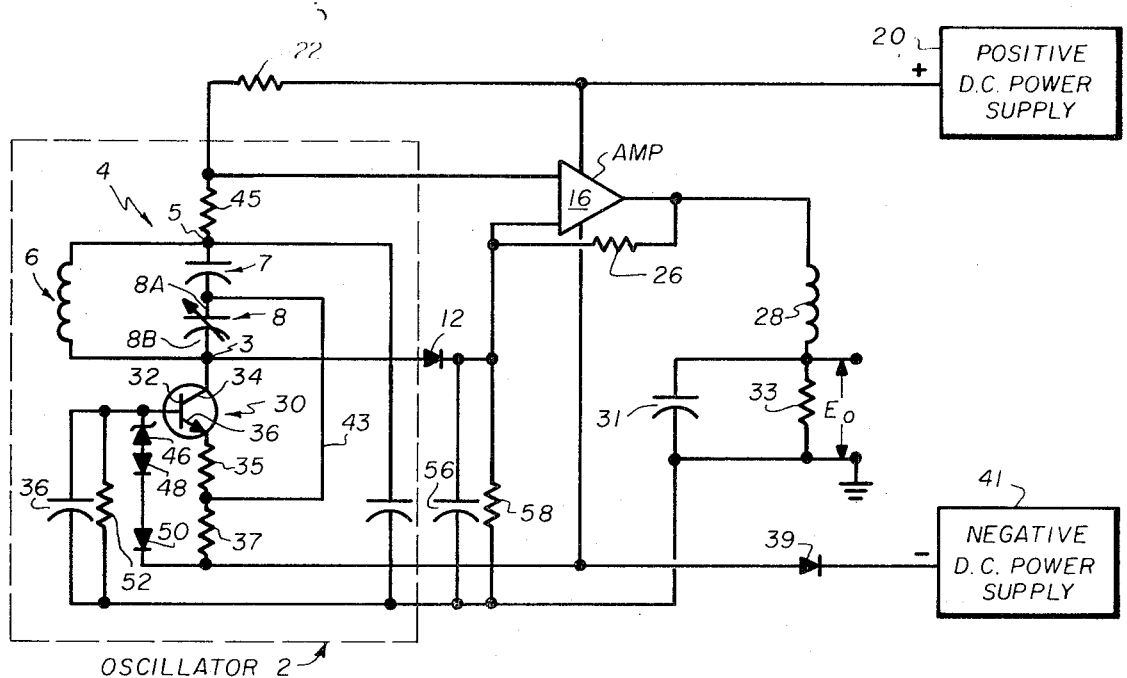
FIG. 1 is an electrical schematic diagram showing a force measuring system according to the invention.
Figure 2:
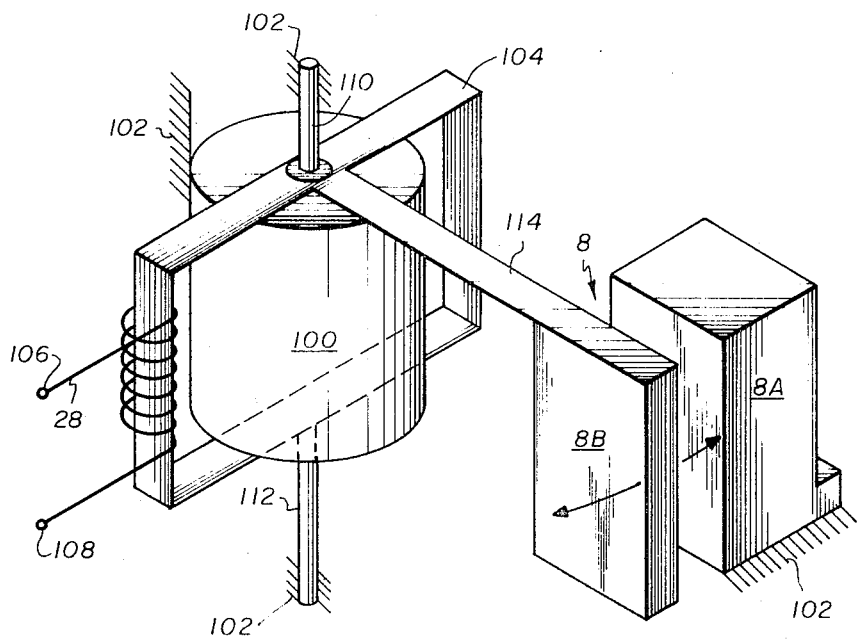
FIG. 2 is an isometric pictorial representation showing the elements of a typical force measuring system.

FIG. 1 shows an oscillator designated generally by the numeral 2 and including a tank circuit 4 having an inductor 6 connected in parallel with serially connected capacitors 7 and 8. Capacitor 8 is a variable capacitor having a stationary plate 8A and a movable plate 8B which is a seismic mass arranged as shown in FIG. 2. The force to be measured displaces capacitor plate 8B. The displacement changes the capacitance of capacitor 8 which, in turn, changes the impedance of tank circuit 4 and the amplitude of an alternating output voltage provided at an output terminal 3 of oscillator 2.

Oscillator 2 is connected at an input terminal 5 and through load resistors 22 and 45 to a positive D.C. power supply such as may be available on aircraft. Power supply 20 provides an input voltage for driving the oscillator. Power supply 20 is connected through resistor 22 to an operational amplifier 16 having a resistor 26 connected in feedback relation thereto. Oscillator 2 is connected at output terminal 3 and through a rectifying diode 12 to operational amplifier 16.

Operational amplifier 16 may be of a conventional type such as described at p. 350, FIG. 8-7, Electronics for Scientists, Malmstadt et al., Benjamin, Inc., New York 1963. Amplifier 16 receives proper operating potentials from positive D.C. power supply 20 and from a negative D.C. power supply 41, and compares the rectified oscillator output voltage to the input voltage from power supply 20 applied through resistor 22 and provides an output voltage corresponding to the difference therebetween.

The difference voltage from amplifier 16 is applied to a servo coil 28 serially connected to a grounded resistor 33. Servo coil 28 restrains displacement of capacitor plate 8B and actually returns the capacitor plate to its original position to render the system in a force balance state. A damping capacitor 31 is connected in parallel with resistor 33 and the voltage drop $E_0$ across resistor 33 caused by the current through coil 28 is a precise measurement of the force acting on capacitor plate 8B.

Oscillator 2 may be of the type described at ch. 10, pp. 165–173, Basic Theory and Application of Transistors (TM 11-690), Department of the Army, Mar., 1959. In particular, the Colpitts type oscillator described at pp. 171–172 and in FIG. 168 of the above noted reference satisfies the requirements of the invention. Oscillator 2 provides appropriate amplification, regenerative feedback and inductance-capacitance tuning, with bias and stabilization optimized for the particular application involved.

Oscillator 2 includes a transistor 30 having base, collector and emitter elements 32, 34 and 36, respectively. Collector element 34 is connected at output terminal 3 to tank circuit 4 and emitter element 36 is connected through resistors 35 and 37 and a diode 39 to negative D.C. power supply 41 which applies proper operating potentials to the circuit. Resistors 35 and 37 develop an input signal for emitter element 36. Regenerative feedback is obtained from tank circuit 4 and is applied to emitter 36 through a conductor 43 connected intermediate capacitors 7 and 8 and connected intermediate resistors 35 and 37. Serially connected diodes 48 and 50 and zener diode 46 couple negative D.C. power supply 41 to base 32 of transistor 30.

Tank circuit capacitors 7 and 8 connected in parallel with inductor 6 form a voltage divider. The voltage developed across capacitor 8 is the feedback voltage, with the capacitance of capacitor 8 varying as capacitor plate 8B is displaced in response to the input force to control the amount of feedback voltage applied to emitter 36.

A resistor 52 limits current flow through diodes 46, 48 and 50. A capacitor 36 connected in parallel with resistor 52 prevents ripple voltages from affecting base 32 of transistor 30. Capacitor 56 and resistor 58 connected to the output circuit of oscillator 2 provide a low pass filter.

It will be understood that positive power supply 20, which may for purposes of illustration provide an oscillator input voltage of 15 volts D.C., is an unregulated power supply with voltage variations occurring in the range of ±15 percent. These variations affect the force measurement being made since the oscillator output voltage follows the input voltage and includes voltage variations therein. The invention minimizes this affect because the measurement is made as a function of the difference between the oscillator input and output voltages. The input voltage variations thereby cancel out and the force measuring system is rendered insensitive to said variations.

It is to be noted that the circuitry heretofore described is merely representative of a suitable electronic configuration for satisfying the requirements of the invention. The novelty of the invention does not reside in the particular elements involved but in the combination of said elements as will now be understood.

In FIG. 2, a typical force sensing system is shown and includes a magnetic core 100 mounted to a case 102 and surrounded by a frame 104 carrying servo coil 28. The ends of servo coil 28 terminate at terminals 106 and 108 which are connected to the circuit of oscillator 2 in FIG. 1. Frame 104 is journaled in case 102 by pivots 110 and 112 for angular displacement relative to core 100. Capacitor plate 8B of capacitor 8 is affixed to frame 104 by a shaft or arm 114 and in its normal position is separated by a predetermined air gap from plate 8A of capacitor 8, plate 8A being mounted to case 102.

In operation, a force which may be, for purposes of illustration, acceleration, displaces capacitor plate 8B and frame 104 having plate 8B affixed thereto and carrying servo coil 28. The displacement changes the capacitance of capacitor 8 and in turn changes the impedance of tank circuit 4 and the output voltage of oscillator 2 of FIG. 1. The change in output voltage is applied through the circuit of FIG. 1 to change the current through servo coil 28 to restore frame 104 and plate 8B to their original positions.

In summary, the output voltage of the oscillator changes as a function of the capacitance of the tank circuit, and which capacitance changes in response to the applied force. The oscillator output voltage is compared to the input voltage and the resulting difference voltage energizes the servo coil. The servo coil renders the system in a force balance state, with the voltage drop caused by the current through the coil being a measure of the applied force. Since the measurement is provided as a function of the difference between the oscillator input and output voltages, input voltage variations are negated and the force measurement is made more precisely than has heretofore been possible.

Although only one embodiment of the invention has been illustrated and described, various changes in the form and relative arrangements of the parts, which will now appear obvious to those skilled in the art may be made without departing from the scope of the invention. For example, although the invention has been described in relation to measuring acceleration, obvious modifications will render the system capable of measuring other forces as well. Reference is, therefore, to be had to the appended claims for a definition of the limits of the invention.

What is claimed is

1. A force measuring system comprising:
an oscillator energized by a voltage from a voltage source and including a tank circuit, a force sensitive element arranged for changing the impedance of the tank circuit when subjected to an applied force and means responsive to the change in impedance for changing the output of the oscillator;
a comparator connected to the voltage source and to the oscillator for comparing the voltage from the voltage source to the output of the oscillator and providing an output corresponding to the difference therebetween;
a servo coil connected to the comparator and responsive to the difference output for applying a restoring force to the force sensitive element to balance the force applied to said element; and
means connected to the servo coil and responsive to the current flow therethrough for providing a measurement of the restoring force.

2. A system as described by claim 1, wherein:
the force sensitive element arranged for changing the impedance of the tank circuit when subjected to the applied force includes a capacitor having a movable plate which is displaced by the force for changing the capacitance of the capacitor and for changing the impedance of the tank circuit and the output of the oscillator accordingly.

3. A force measuring system, comprising:
an oscillator energized by a voltage from a voltage source and providing an output;
a force sensitive element included in the oscillator and arranged to change the output of the oscillator when subjected to a force;
a comparator energized by the voltage from the voltage source and connected to the oscillator for comparing the voltage from the voltage source to the output of the oscillator and providing a difference voltage;
means connected to the comparator and responsive to the difference voltage and arranged to apply a restoring force to the force sensitive element to balance the force applied to said element; and
means connected to the last mentioned means for providing a measurement of the restoring force.

4. A system as described by claim 3, wherein:
the force sensitive element included in the oscillator and arranged to change the output of the oscillator when subjected to a force includes a capacitor having a movable plate which is displaced by the force for changing the capacitance of the capacitor and for changing the oscillator output accordingly.

5. A force measuring system comprising:
an oscillator energized by a voltage from a voltage source, and having a capacitor responsive to an applied force and adapted to change the output of the oscillator in accordance with a change in the applied force;
a comparator energized by the voltage from the voltage source and connected to the oscillator for comparing the voltage from the voltage source to the output of the oscillator to provide a difference output
force applying means connected to the comparator and responsive to the difference output therefrom for applying a restoring force to the capacitor to balance the force applied thereto; and
means connected to the force applying means for providing a measurement of the restoring force.

6. A system as described by claim 5, wherein:
the force applying means is a servo coil; and
the means connected to the force applying means for providing a measurement of the restoring force is an impedance connected to the servo coil for providing said measurement as a function of the current through the coil.

7. A system as described by claim 6, wherein:
the impedance connected to the servo coil for providing said measurement as a function of the current through the coil is a resistor serially connected to the coil, with the voltage drop across the resistor caused by the current through the coil providing said measurement.

* * * * *